United States Patent [19]

Ito et al.

[11] Patent Number: 5,021,955
[45] Date of Patent: Jun. 4, 1991

[54] ELECTRONIC CONTROLLER FOR AUTOMATIC TRANSMISSION

[75] Inventors: Yasunobu Ito; Kunihiro Yamada, both of Aichi, Japan

[73] Assignee: Aisin AW Kabushiki Kaisha, Japan

[21] Appl. No.: 270,033

[22] Filed: Nov. 14, 1988

[30] Foreign Application Priority Data

Dec. 25, 1987 [JP] Japan .............................. 62-326787

[51] Int. Cl.⁵ ..................... B60K 28/00; B60Q 11/00; G05B 11/01
[52] U.S. Cl. .................................. 364/424.1; 74/866; 340/441
[58] Field of Search ............... 364/424.1; 74/866, 878, 74/336 R; 192/0.033; 340/428, 441

[56] References Cited

U.S. PATENT DOCUMENTS

| | | | |
|---|---|---|---|
| 3,406,318 | 10/1968 | Harland et al. | 317/43 |
| 4,174,495 | 11/1979 | Rosa | 323/9 |
| 4,414,863 | 11/1983 | Heino | 74/866 |
| 4,442,727 | 4/1984 | Young | 74/336 R |
| 4,523,281 | 6/1985 | Noda et al. | 192/0.033 |
| 4,734,861 | 3/1988 | Bertolasi et al. | 364/424.1 |

Primary Examiner—Felix D. Gruber
Attorney, Agent, or Firm—Lorusso & Loud

[57] ABSTRACT

In an electronic controller for an automatic transmission having at least one driving circuit incorporating a switching device for driving a solenoid used as an actuator, at least one monitor circuit for detecting an abnormal state of the actuator, and a control section connected to these circuits, an emergency power cutoff circuit is provided between the solenoid driving circuit and the positive terminal of a battery (solenoid driving power source). The switching operation of the emergency power cutoff circuit is freely controlled to effect fail-safe control on the basis of a signal which is output from a microcomputer if, for example, the switching device in the controller malfunctions by short-circuiting.

5 Claims, 3 Drawing Sheets

FIG. I
(PRIOR ART)
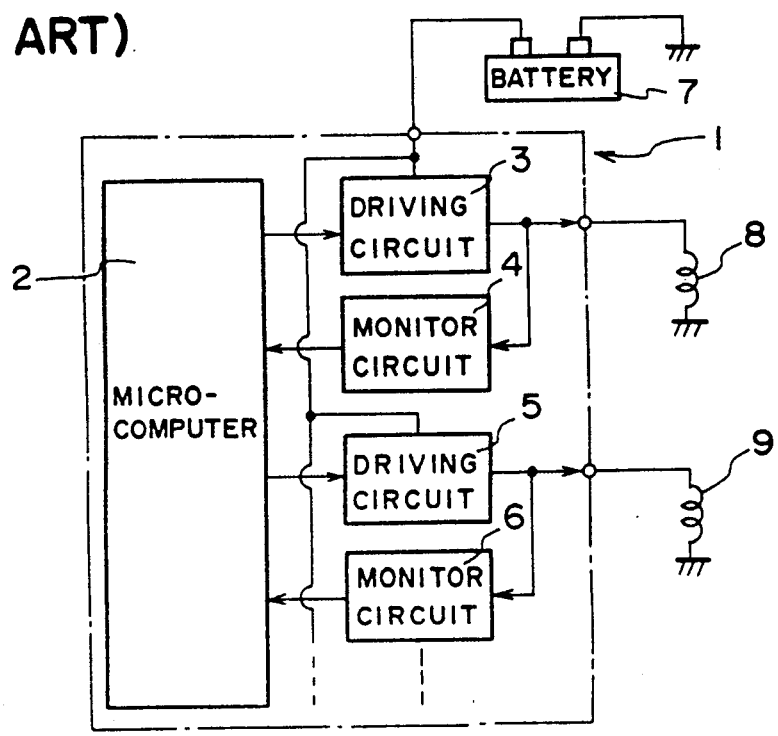
FIG. 3
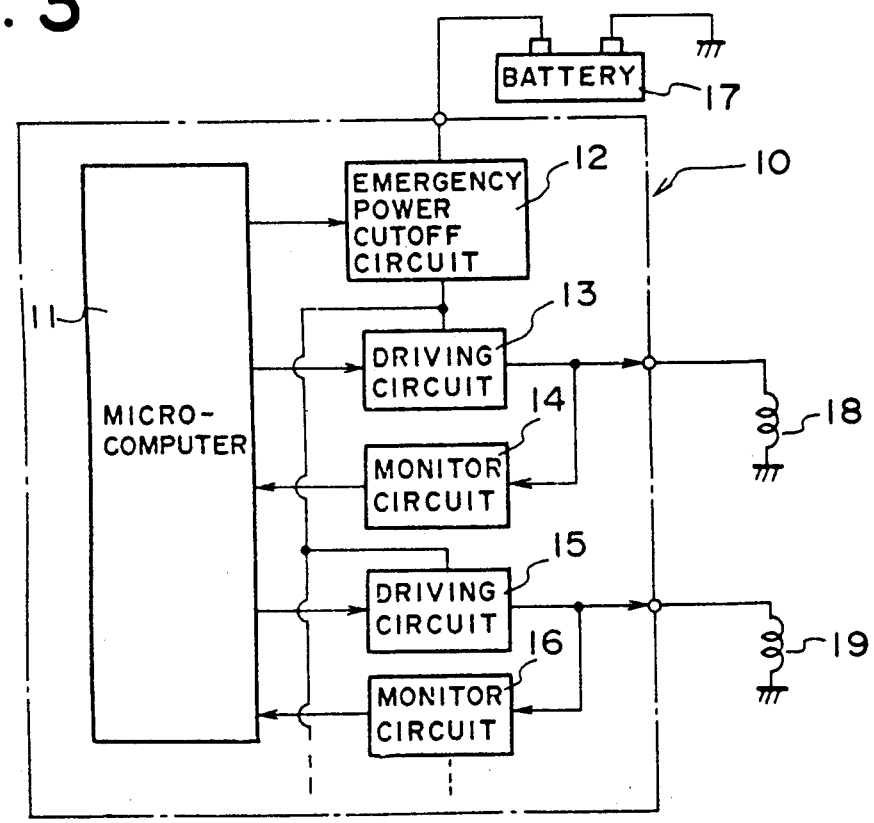

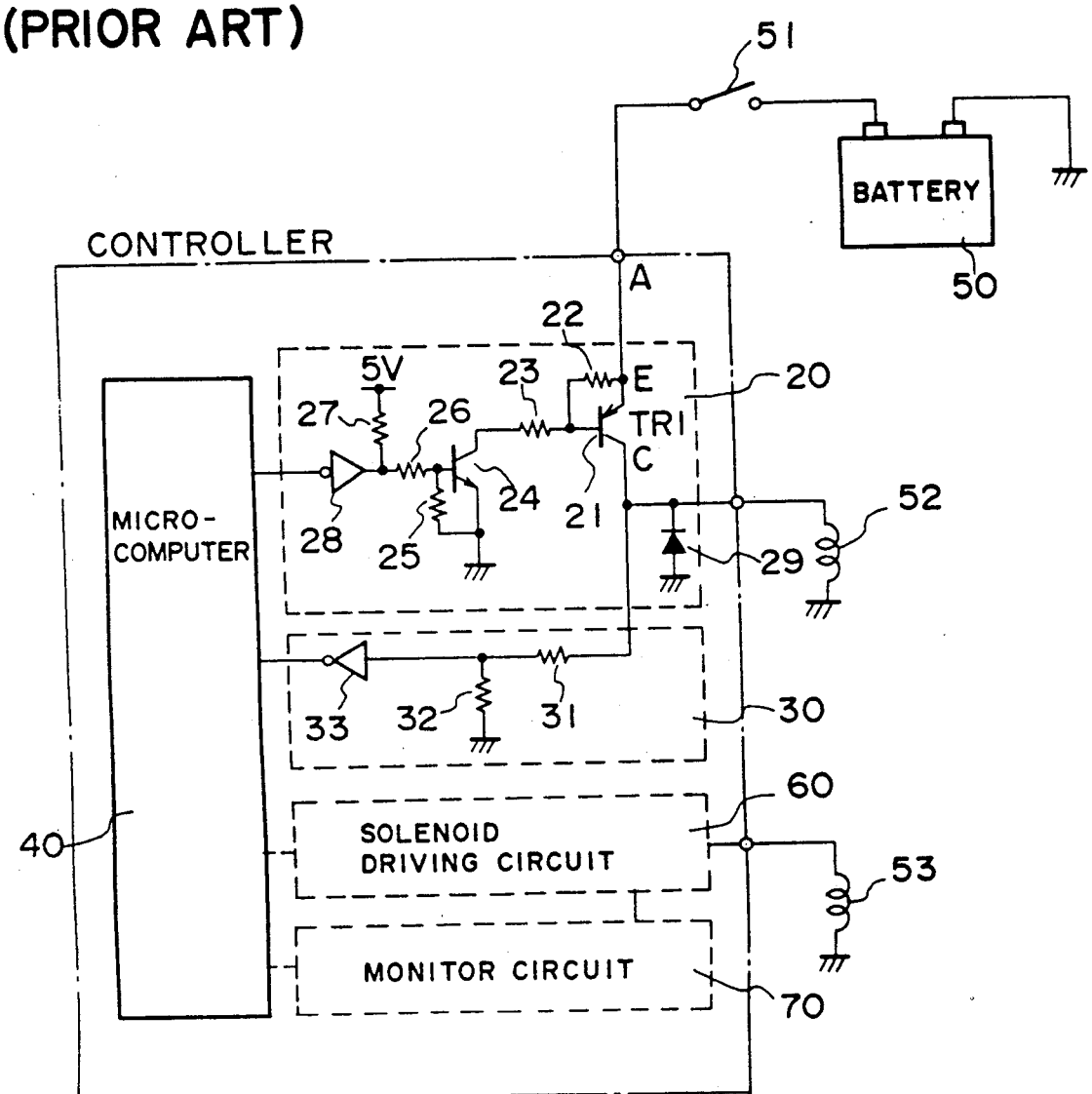

ELECTRONIC CONTROLLER FOR AUTOMATIC TRANSMISSION

BACKGROUND OF THE INVENTION

This invention relates to an electronic controller for controlling an automatic transmission with fail-safe control functions provided to cope with malfunctions of a controller circuit for driving an actuator such as a solenoid.

Ordinarily, in electronically controlled automatic transmissions, solenoids are used as actuators for shifting, lock-up clutch operation, pressure regulation, and similar operations. If a malfunction of such solenoids due to disconnection or a short circuit takes place, the electronic controller controls the transmission so as to avoid considerable failure in the running of the vehicle.

The arrangement of an electronic controller of this kind will be described below with reference to FIGS. 1 and 2. FIG. 1 is a schematic diagram of the construction of a conventional electronic automatic transmission controller of this kind.

As shown in FIG. 1, an electronic controller 1 is constituted by a microcomputer 2, a first driving circuit 3 for driving a first solenoid 8, a first monitor circuit 4 for observing the first solenoid 8, a second driving circuit 5 for driving a second solenoid 9, and a second monitor circuit 6 for observing the second solenoid 9.

FIG. 2 shows an example described below of the circuit arrangement corresponding to that shown in FIG. 1.

A solenoid driving circuit 20 is constituted by a switching p-n-p transistor (TR1) 21, resistors 22, 23, 25 26, and 27, an n-p-n transistor 24, a negative logic NOT circuit 28, and a diode 29. A monitor circuit 30 is constituted by resistors 31 and 32, and a positive logic NOT circuit 33. A battery 50 provided as a power source is connected to a point E for connection to the emitter of the TR1 of the solenoid driving circuit 20. A solenoid 52 is connected at its one end to the ground and at its other end to a point C for connection to the collector of the TR1. Similarly, a solenoid driving circuit 60 for driving a solenoid 53 and a monitor circuit 70 for observing this solenoid are provided.

It is possible to manufacture this controller in full consideration of improvement in the reliability of the switching device as well as wiring while adopting suitable measures for attaining safety with respect to mechanisms. However, it is difficult for this controller to effect desired control if an abnormality such as a short circuit of the switching device takes place. A further improvement in controllers of this kind is therefore expected.

SUMMARY OF THE INVENTION

In view of this problem, it is an object of the present invention to provide an electronic controller for automatic transmissions which has fail-safe functions to cope with a malfunction of a switching device such as a transistor provided in the controller as well as a malfunction of an actuator such as a solenoid.

In accordance with the present invention, an emergency power cutoff circuit is added to a circuit arrangement having the above-described fail-safe functions by being inserted in the line connecting at least one solenoid driving circuit and the positive terminal of a battery (solenoid driving power source) to each other, and the switching operation of the emergency power cutoff circuit is freely controlled to effect fail-safe control on the basis of a signal which is output from a microcomputer if, for example, the switching device in the controller malfunctions by short-circuiting.

Where a plurality of solenoid driving circuits are connected to this emergency power cutoff circuit, it is possible to cut off all the solenoids forcibly and simultaneously irrespective of the states of the outputs from the individual solenoids or of whether or not any one of the actuator circuits malfunctions.

BRIEF DESCRIPTION OF THE DRAWINGS

FIG. 1 is a schematic diagram of the construction of a conventional electronic controller for automatic transmissions;

FIG. 2 is a circuit diagram of the electronic automatic transmission controller shown in FIG. 1;

FIG. 3 is a schematic diagram of the construction of an electronic automatic transmission controller in accordance with the present invention.

DESCRIPTION OF THE PREFERRED EMBODIMENT

Figure 4:
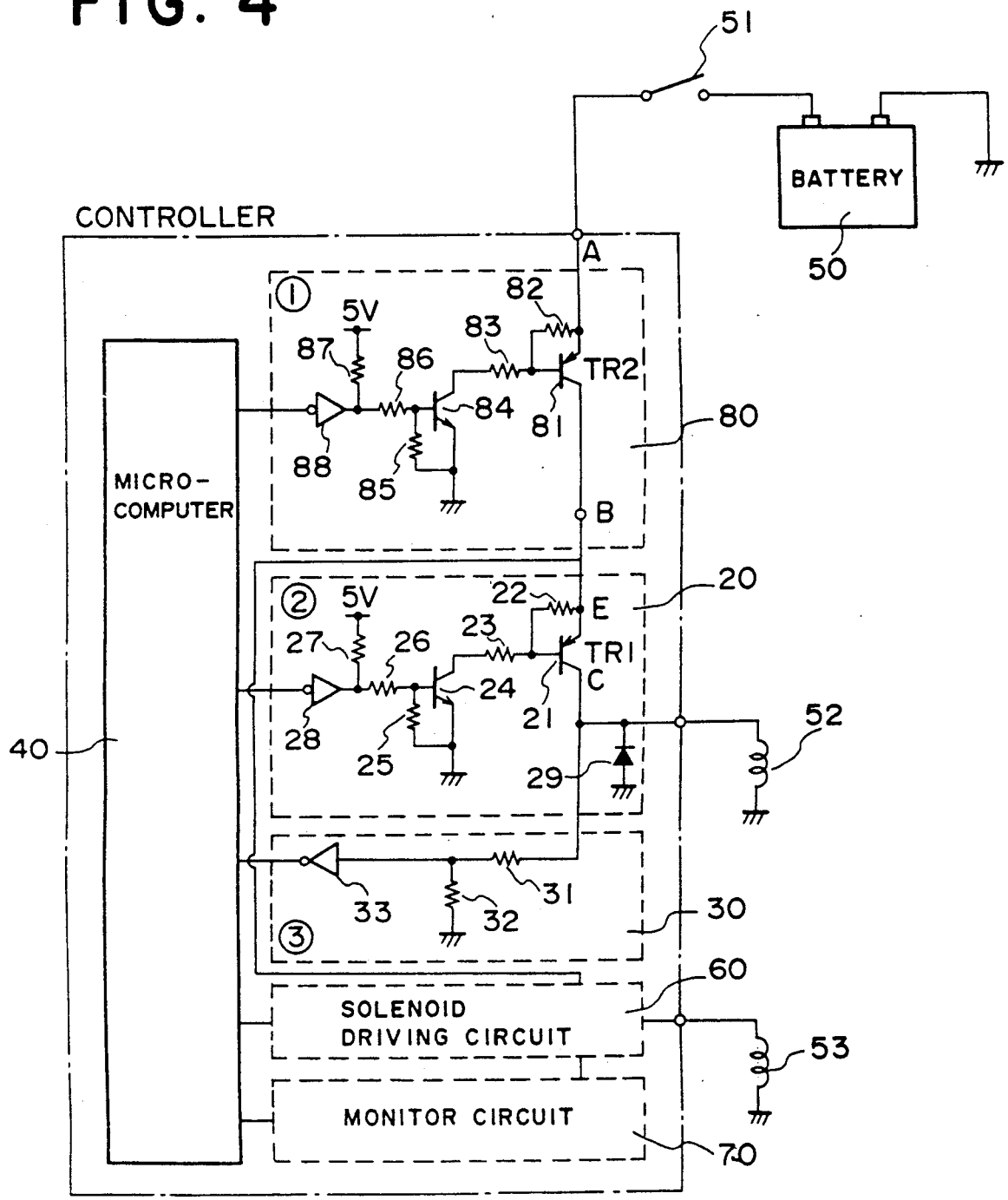
FIG. 4 is a circuit diagram of the electronic automatic transmission controller shown in FIG. 3.

An embodiment of the present invention will be described below in detail with reference to the accompanying drawings.

FIG. 3 shows an electronic controller 10 having: a circuit arrangement with fail-safe functions whereby fail-safe control is performed with monitor circuits 14 and 16 if a malfunction of solenoids 18 and 19 due to a cause such as a short circuit or disconnection takes place; and a circuit 12 for cutting off the power supply at the time of emergency which is inserted in the power supply line between driving circuits 13 and 15 for driving solenoids 18 and 19 and the positive terminal of a battery 17 (solenoid driving power source). The switching operation of the emergency power cutoff circuit 12 is freely controlled in response to outputs from a microcomputer 11 which constitutes a control section which operates if, for example, a switching device provided in the electronic controller 10 malfunctions due to a short circuit.

FIG. 4 shows an example of the circuit arrangement corresponding to that shown in FIG. 3.

This embodiment is arranged in such a manner that, if a switching device, such as p-n-p transistor (TR1) 21 provided in a solenoid driving circuit 20 malfunctions, its state is detected by a monitor circuit, and a microcomputer 40 which constitutes a control section outputs a signal to operate a p-n-p transistor (TR2) 81 provided in an emergency power cutoff circuit 80, thereby cutting off the power source. That is, the emergency power cutoff circuit 80 has a switching p-n-p transistor 81, resistors 82, 83, 85, 86, and 87, an n-p-n transistor 84, and a negative logic NOT circuit 88. Except for this, the arrangement is the same as the above-described conventional arrangement, and the description for the same features will not be repeated.

For instance, the resistor 22 has a resistance value of 4.7 kΩ; the resistor 23, 270 Ω; the resistor 25, 47 kΩ; the resistor 26, 2.2 kΩ; the resistor 27, 4.7 kΩ; the resistor 31, 10 kΩ; the resistor 32, 22 kΩ; the resistor 82, 4.7 kΩ; the resistor 83, 130 Ω; the resistor 85, 4.7 kΩ; the resistor 86, 1 kΩ; and the resistor 87, 2.7 kΩ.

If, in the conventional circuit included in the arrangement shown in FIG. 4, the switching p-n-p transistor (TR1) 21 in the solenoid driving circuit 20 malfunctions by short-circuiting due to a certain cause, e.g., a disturbance such as a surge, noise or an excess current, deterioration or defect in the device, that is, a short circuit takes place between the points E and C of the emitter and the collector of the TR1, the solenoid and the battery is directly connected and the solenoid is maintained in the energized state. It is impossible for the control unit to cut off the power supply to the solenoid, resulting in failure in the control of the solenoid.

In accordance with this embodiment, however, the monitor circuit 30 detects such a malfunction by short-circuiting of the TR1 and supplies a signal to the microcomputer 40. That is, if an output signal "low level" is supplied from the monitor circuit 30 in response to a signal "high level" from the microcomputer 40, it is determined that the TR1 malfunctions. In this event, that output signal is sent from the microcomputer 40 to the NOT circuit 88 of the emergency power cutoff circuit 80 and is inverted therein, and the n-p-n transistor 84 and, hence, the TR1 are turned off, thereby shutting off the power supply circuit and turning off the solenoid 52.

It is also possible to connect the solenoid driving circuit 60 and the monitor circuit 70 to the emergency power cutoff circuit 80. A plurality of solenoid driving circuits 60 and a plurality of monitor circuits 70 may be connected to the emergency power cutoff circuit 80 in this manner, thereby enabling all the solenoids connected thereto to be forcibly cut off simultaneously.

In the above-described example, transistor are used as the switching devices. However, any other types of switching devices including relays and power MOS-FETs are applicable so long as they are switching devices. The emergency power cutoff circuit may be operated with respect to connection to only one solenoid or may be operated as a circuit adapted in common for connection to a plurality of solenoids provided as desired.

The present invention is not limited to the above-described embodiment; other various modifications based on the spirit of the present invention are possible and they are not excluded from the scope of the present invention.

What is claimed is:

1. An electronic controller for an automatic transmission having at least one driving circuit incorporating a switching device for driving a solenoid, at least one monitor circuit for detecting an abnormal state of said switching device, and a control section connected to said driving and monitor circuits, said electronic controller comprising:
   an emergency power cutoff circuit interposed between said driving circuit and a power source;
   said driving circuit being connected to an output of said emergency power cutoff circuit;
   said control section being connected to an output of said monitor circuit, a control input of said driving circuit and a control input of said emergency power cutoff circuit;
   wherein, if an abnormality of said switching device of said driving circuit occurs, said monitor circuit detects the abnormality and supplies a detection signal to said control section, and said control section outputs a signal to said emergency power cutoff circuit to cut off the power to said driving circuit and said solenoid.

2. An electronic controller for an automatic transmission according to claim 1, wherein said emergency power cutoff circuit includes a switching device.

3. An electronic controller for an automatic transmission according to claim 2, wherein said switching device is a transistor.

4. An electronic controller for an automatic transmission according to claim 1, wherein a plurality of said driving circuits and a plurality of said monitor circuits are connected to said emergency power cutoff circuit.

5. An electronic controller for an automatic transmission, comprising:
   a plurality of driving circuits each incorporating a switching device for driving a solenoid;
   a plurality of monitor circuits for detecting an abnormal state of said switching devices;
   a control section connected to said driving circuits and to said monitor circuits; and
   an emergency power cutoff circuit interposed between said driving circuits and a power source;
   each of said driving circuits being connected to an output of said emergency power cutoff circuit;
   said control section being connected to an output of each monitor circuit, a control input of each driving circuit and a control input of said emergency power cutoff circuit;
   wherein, if an abnormality of any switching device of said driving circuits occurs, the corresponding monitor circuit detects the abnormality and supplies a detection signal to said control section, and said control section outputs a signal to said emergency power cutoff circuit to cut off the power to all of said driving circuits and said solenoids.

* * * * *